United States Patent [19]
Bergerus

[11] Patent Number: 5,817,947
[45] Date of Patent: Oct. 6, 1998

[54] MEASURING DEVICE FOR MEASURING ONE OR MORE PROPERTIES, SUCH AS THICKNESS AND TENSION PROFILE, OF A THIN OBJECT

[75] Inventor: Christer Bergerus, Uppsala, Sweden

[73] Assignee: Novatech GmbH, Reutlingen, Germany

[21] Appl. No.: 637,686

[22] PCT Filed: Sep. 8, 1995

[86] PCT No.: PCT/SE95/01010

§ 371 Date: May 8, 1996

§ 102(e) Date: May 8, 1996

[87] PCT Pub. No.: WO96/07871

PCT Pub. Date: Mar. 14, 1996

[30] Foreign Application Priority Data

Sep. 9, 1994 [SE] Sweden .................................. 9403018

[51] Int. Cl.$^6$ .................................................. G01N 3/08
[52] U.S. Cl. ................................................. 73/826; 73/855
[58] Field of Search ............................. 73/826, 827, 828, 73/829, 831, 832, 841, 842, 855, 856, 857

[56] References Cited

U.S. PATENT DOCUMENTS

| | | | |
|---|---|---|---|
| 2,051,636 | 8/1936 | Gastrich . | |
| 3,870,629 | 3/1975 | Carter et al. | 209/111.8 |
| 4,821,565 | 4/1989 | Vossbeck et al. | 73/159 |
| 5,373,723 | 12/1994 | Chou | 73/9 |

FOREIGN PATENT DOCUMENTS

| | | |
|---|---|---|
| 0279173 | 8/1988 | European Pat. Off. . |
| 3507651 | 4/1986 | Germany . |
| 4217682 | 11/1993 | Germany . |

OTHER PUBLICATIONS 4 photos of apparatus installed at Fennofelt, Finland, 1990, 2 pages.
List of installations in Finland, India and USA, 1990, 1 page.
Description of apparatus of D1 and D2, 1990, 11 pages.
Short description of apparatus of D1 and D2, 1990, 6 pages.
Detailed photograph of apparatus of D1 and D2, 1990, 1 page.
Brochure on apparatus of D1, 1990, 4 pages.
Part of a brochure showing the apparatus of D7 (German reference listed above), 1987–1990, 8 pages .
Copy of photo of a further installation of apparatus of D7, 1992, 2 pages.

*Primary Examiner*—Elizabeth L. Dougherty
*Assistant Examiner*—Max H. Noori
*Attorney, Agent, or Firm*—Sughrue, Mion, Zinn, Macpeak & Seas, PLLC

[57] ABSTRACT

A measuring device is provided for measuring one or more properties, such as thickness and tension profiles of a thin object, especially a fabric. The measuring device includes an upper mobile member adapted to be placed on the top side of the thin object, a lower mobile member adapted to be placed on the bottom side of the thin object, directly below the upper mobile means, magnets for holding together the upper and the lower mobile members with the thin object in between without damaging the thin object, and a measuring device provided on at least one of the mobile members for measuring the properties of the thin object. The mobile members are moveable together or separately across the surface of the thin object.

11 Claims, 4 Drawing Sheets

MEASURING DEVICE FOR MEASURING ONE OR MORE PROPERTIES, SUCH AS THICKNESS AND TENSION PROFILE, OF A THIN OBJECT

TECHNICAL FIELD

The present invention relates to a measuring device for measuring the properties of a thin object, especially a fabric, said properties being such as thickness and tension profile across the entire width of the object. The thin object could also be a felt or a cloth. In the present invention it is intended that a thin object is an object having a thickness of up to 20 mm, and especially up to 10 mm.

BACKGROUND ART

It is known that the quality of the finished paper product in paper manufacturing to a large extent is dependent upon the fabric. Therefore it is very important for the paper manufacturer to get knowledge about the fabrics prevailing condition and properties, such as thickness and tension profile, permeability etc. To measure those properties in a reliable way is very difficult today, single there is a lack of measuring apparatuses and methods being capable of mapping the properties across the entire width of the fabric. It is primarily the width of the fabric, up to 10 meters and greater, that makes it difficult to carry out these measurements.

Today the thickness of the fabric is measured with a dial indicator. The problem with this method is that only a few individual points across the edges of the fabric are reachable. Thus, it is difficult to get a picture about the entire thickness profile of the fabric. However, the main problem is that it is difficult to obtain an accurate indication of the position across the width of the fabric for the point being measured for this manual measurement of thickness using the dial indicator. Thereby also the problem to make new comparative measurements at a later point of time arises.

The problems described above in conjunction with the measurement of the thickness also apply to the measurement of the tension profile, permeability etc. of the fabric, even if it has been possible to measure those across the entire fabric. Thus, there is a need to being able to repeatedly carry out measurements across the entire width of the fabric in a simple and reliable way.

EP-0 279 173 discloses a device for measuring changes in the surface profile of strip shaped materials, in an unrolled position, especially photographic base paper. The measuring device is provided inside a carriage like, wheel equipped stand. The transducer of the measuring device is resiliently provided at the bottom of the carriage-like stand to measure changes in the surface profile of the photographic base paper. The carriage-like stand is rolled over the photographic base paper during the measuring process. Thus, the device according to EP-0 279 173 measures the object to be measured from only one side, i.e. only the surface profile and not the thickness profile. Furthermore this device is designed for single measurements, i.e. the purpose is to approve or disapprove the quality of the object being measured and thus the position of the measuring point is not established.

DE-3 507 651 discloses a measuring device for measuring the thickness of extended, extruded plastic objects. In one embodiment the illustrated device measures the thickness of a foil. By means of permanent magnets, that are provided on a support rail on which the foil rests, the thickness of the foil is measured by a measuring head which slides over the foil detecting changes in the magnetic field. The measuring head is brought over the measured object across a rail. If this is done manually or automatically cannot be concluded from the description. This device measures the thickness of the object to be measured, since the measuring device is provided on both sides of the object, but measuring with this device is very time consuming, since permanent magnets first must be arranged on one side of the object to be measured. Furthermore, this device does not have any means to register at which position the measurement is carried out. Therefore this device is not suitable for repeatable, comparative measurements.

OBJECT OF THE INVENTION

The object of the present invention is to provide a measuring device which is capable of measuring the properties of a thin object, especially a fabric, said properties being, for example the thickness profile and the tension profile across the entire width of the object.

In a preferred embodiment of the invention there is further provided a measuring device comprising position determining means to repeatedly be able to carry out measurements on the thin object.

DESCRIPTION OF THE DRAWINGS

Different embodiments of the invention will be described in more detail below in conjunction with the accompanying figures, in which.

DESCRIPTION OF PREFERRED EMBODIMENTS

Figure 1:
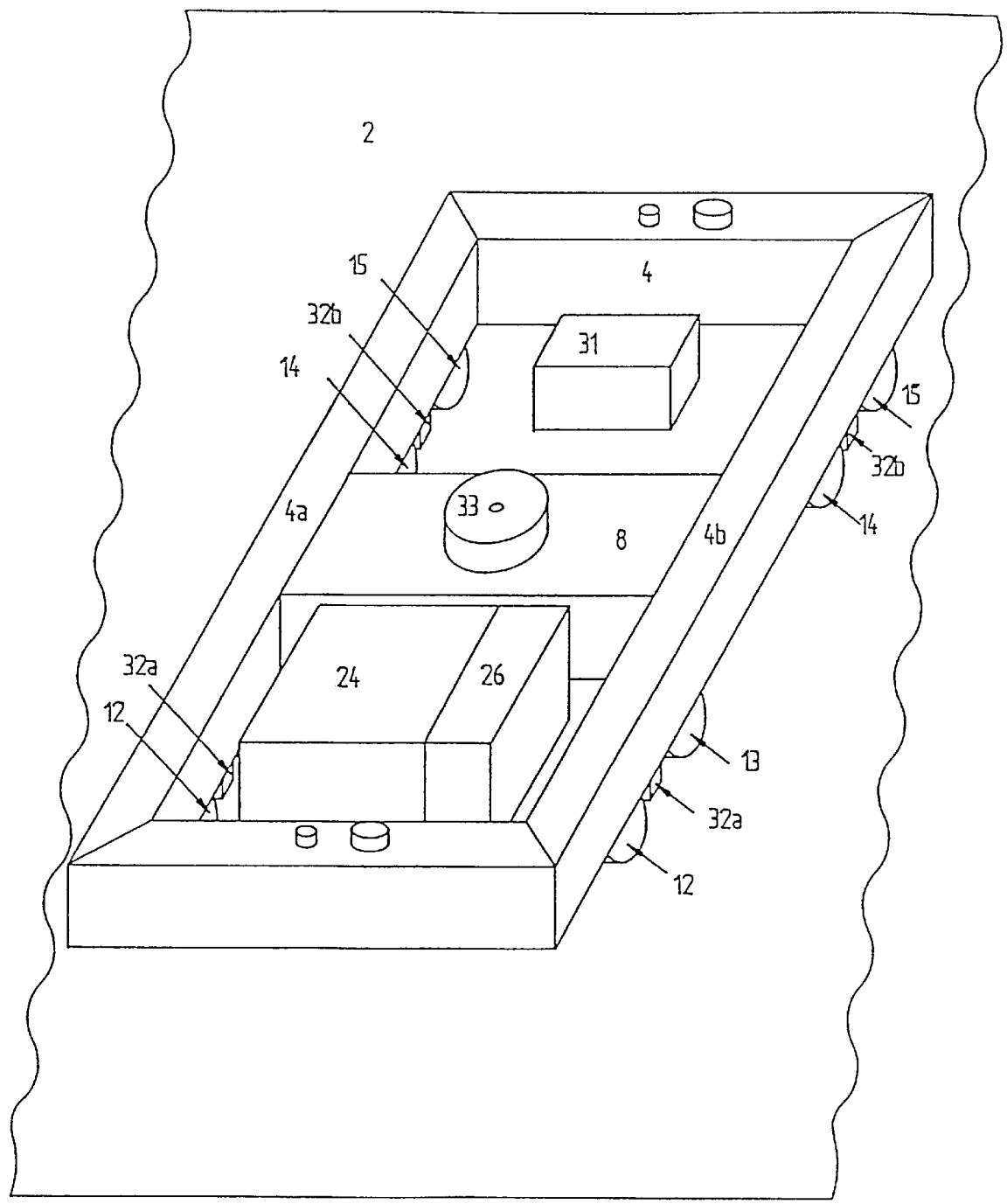
FIG. 1 is a schematic view showing a first embodiment of the upper carriage of the measuring device according to the present invention.
Figure 2:
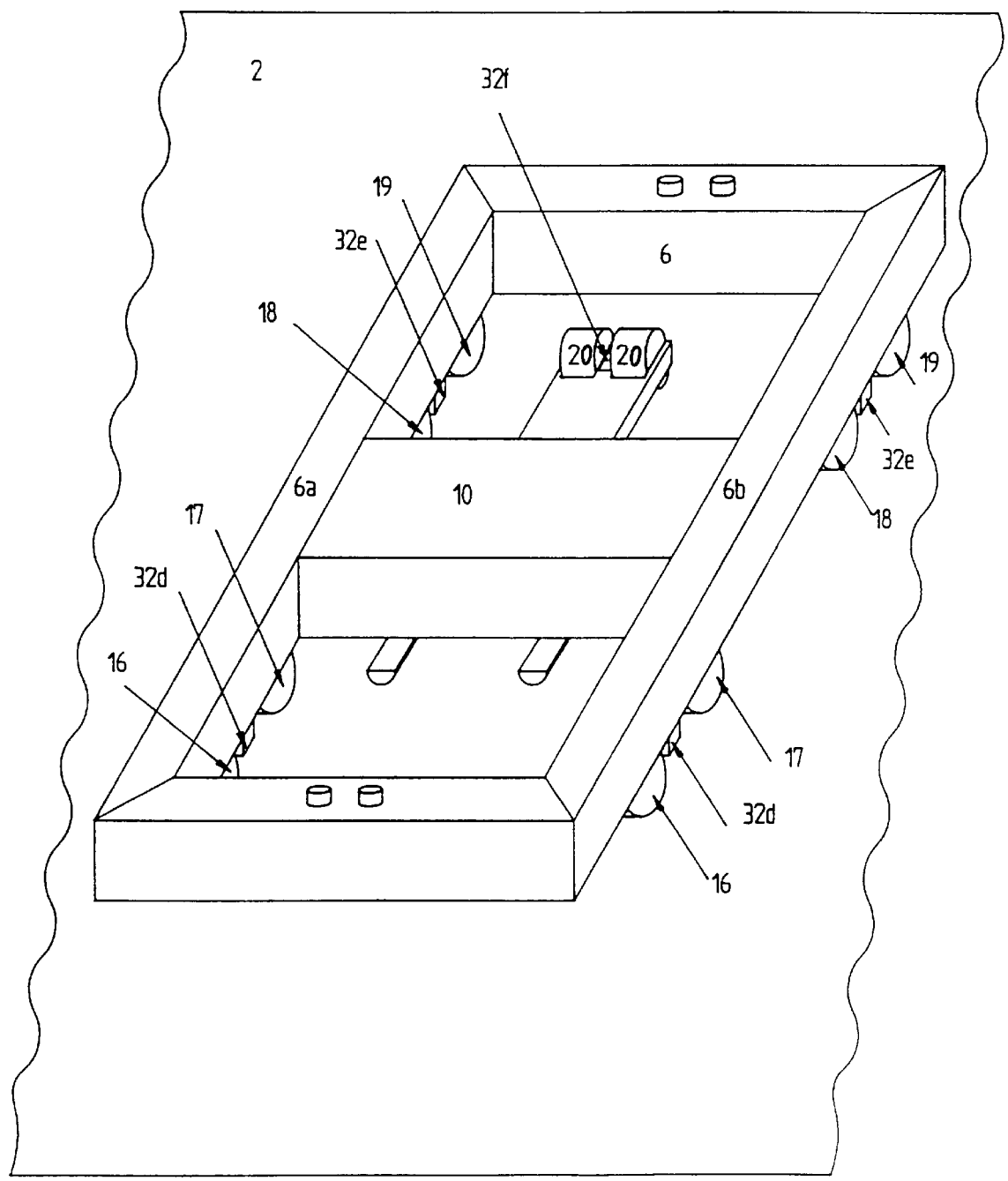
FIG. 2 is a schematic view showing a first embodiment of the lower carriage of the measuring device according to the present invention.
Figure 3:
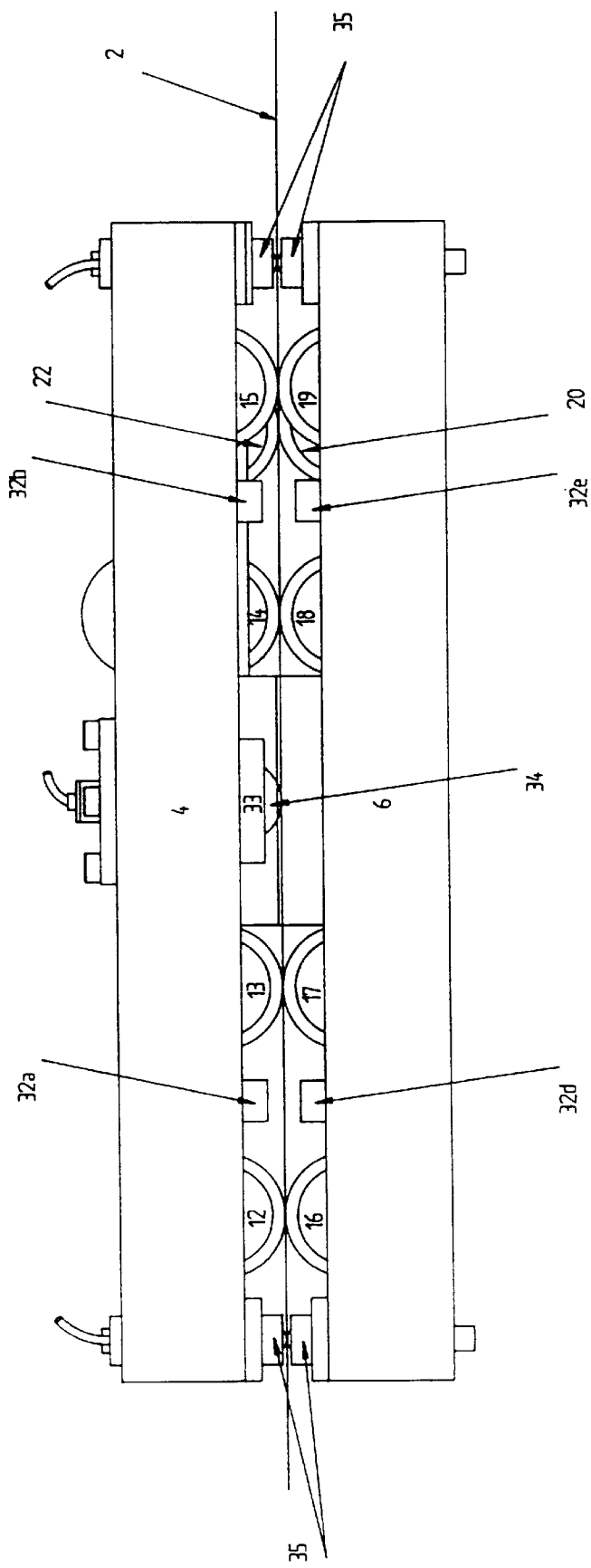
FIG. 3 is a side view showing the two carriages in FIG. 1 and FIG. 2.

FIGS. 1 to 3 show a first embodiment of the present invention. The measuring device comprises two carriages, of which the upper carriage is shown in FIG. 1 and the lower carriage is shown in FIG. 2. FIG. 3 shows the two carriages together in a side view. The two carriages are separated from each other by a thin object 2, on which the measurement is to be carried out and which throughout the description will be referred to as the object to be measured.

The two carriages, in FIGS. 1 to 3 comprise, two frames 4 and 6, two mounting plates 8 and 10, eighteen support wheels 12–20, two driving wheels 22, a controller 24, memory means 26, measuring means comprising a load cell 33 and two inductive transducers 35, driving means 31 and ten permanent magnets 32*a*–32*f*.

Figure 4:
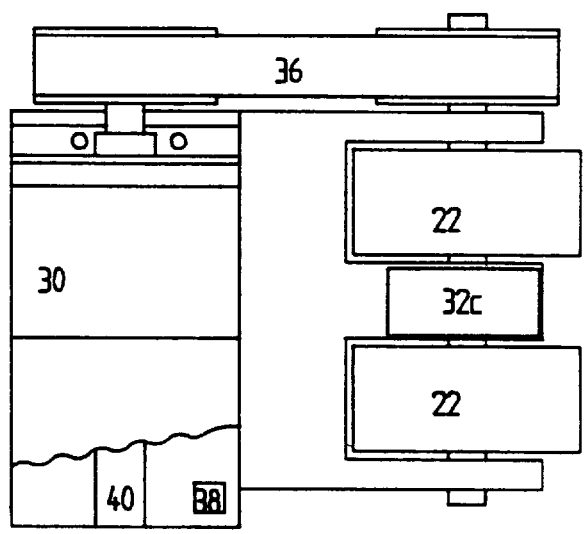
FIG. 4 is a view showing the driving means of the measuring device.

The measuring device thus comprises two carriages of which the upper carriage shown in FIG. 1 will be described first. The body of the upper carriage is made up of a rectangular frame 4. The frame 4 is preferably made of a light material, such as a rectangular section of aluminium, in order to keep down the weight of the measuring device and thereby the driving power required. On the frame 4 the controller 24 and the memory means 26 are provided. The mounting plate 8 is provided between both the long sides 4*a* and 4*b* of the frame 4. On the mounting plate 8 there is in turn provided a part of the measuring means, which will be described in more detail below. Adjacent to the mounting plate 8 there is provided the driving means 31, which comprises a DC motor 30 and the two driving wheels 22. The driving means 31 will be described in more detail in conjunction with FIG. 4. The support wheels 12–15 are provided on both the long sides 4a and 4b. The magnet 32a is provided between the two pairs of front wheels 12 and 13 on the long sides 4a and 4b respectively. In a corresponding way the magnet 32b is provided between the two pairs of rear wheels 14 and 15. Furthermore the magnet 32c, which is shown in FIG. 4, is provided between the driving wheels 22.

The lower carriage of the measuring device, which is shown in FIG. 2, also comprises a rectangular frame 6, which is made of a light material. In a similar way as in the case with the upper carriage a mounting plate 10 is provided between the two long sides 6a and 6b of the frame 6. This mounting plate 10 is used among other things, by means of a fixture, to mount a part of the measuring means, when the measuring means consists of two parts, which have to be mounted on both sides of the object to be measured, for example if the measuring means is an inductive transducer 35. Two support wheels 20 are provided adjacent to the mounting plate 10. These support wheels 20 are provided correspondingly to the two driving wheels 22 of the upper carriage. The support wheels 16–19 are provided on the long sides 6a and 6b of the frame 6 correspondingly to the position of the support wheels 12–15 of the upper carriage in FIG. 1, and the only thing preventing the support wheels 12–15 from making contact with the support wheels 16–19 is the object to be measured 2. The magnet 32d is provided between the two pairs of front wheels 16 and 17 on the long sides 6a and 6b respectively and in a corresponding way the magnet 32e is provided between the two pairs of rear wheels 18 and 19. Furthermore the magnet 32f is provided between the support wheels 20.

The magnets 32a–32f are provided in pairs with the first magnet 32a–32c in each pair secured on the upper carriage and the second magnet 32d–32f in each pair secured on the lower carriage. The first magnet 32a–32c in each pair attracts the second magnet 32d–32f in each pair, said magnets in each pair are located in corresponding locations on each side of the object to be measured 2. The power of the magnets 32a–32f are adapted in such a manner that they secure the two carriages of the measuring device together when the driving means 31 drives them across the object being measured 2. The magnets 32a–32f are preferably permanent magnets, but electromagnets or other means for holding the carriages together could also be used.

In the first embodiment, which is shown in FIGS. 1 to 3, the measuring means comprises, a load cell 33 with a measuring head 34 and two inductive transducers 35. The load cell 33 is secured on the mounting plate 8 in such a manner that the measuring head 34 makes contact with the object 2 to be measured in order to measure its tension. The two inductive transducers 35 are provided at two of the corners of the upper frame 4 and the lower frame 4 respectively. Thus, the inductive transducers are divided into two parts, one part constituting the transducer itself and the other part constituting the reference surface. The parts are placed at each side of the object 2 to be measured. This is necessary to be able to measure the thickness profile of the object 2.

In a second embodiment (not shown) only one inductive transducer is provided, with the first part being secured on the mounting plate 8 and the second part on the mounting plate 10. In further embodiments the measuring means could comprise a permeability transducer, which only consists of one transducer part or the measuring means could comprise a combination of different transducers. Such transducers could be optical transducers, different kinds of cameras to measure thickness, permeability, tension, topography etc.

FIG. 4 shows an enlarged view of the driving means 31. The driving means 31 comprises, as already mentioned, the DC motor 30 and the two driving wheels 22. The DC motor 30 is coupled to the driving wheels 22 by means of a driving belt 36. The driving wheels 22 make contact with object 2 to be measured, on which opposite side the support wheels 20 make contact, and drive the measuring device across the object 2 during the measuring process. Thus, the driving wheels 22 are designed in such a manner that the friction between the object 2 to be measured and the driving wheels 22 is great enough to drive the measuring device forward. Instead of a DC motor 30 the driving means could comprise some other suitable driving source.

In a preferred embodiment of the invention is provided means 38 for determining the position, preferably a pulse transducer, adjacent to a driving shaft 40 of the DC motor 30. The pulse transducer 38 counts marks on the driving shaft 40 and determines in said manner the position of the measuring device. In that way it is possible to link the measurement reading to a position on the object 2 being measured. In another embodiment said pulse transducer 38 is secured adjacent to a special support wheel (not shown), to ensure that the pulse transducer 38 gives a correct position at all times. This embodiment is especially suitable when there exists a risk that the driving wheels 22 spin, since the determination of the position in this case is independent of the driving shaft 40 of the DC motor 30.

To better understand how the different means in the measuring device cooperate the description will now be directed towards a typical measuring process, which measures properties of a fabric.

At the start of the process the upper carriage of the measuring device is placed on top of the fabric. The lower carriage is placed in a corresponding way under the fabric. Due to the magnets 32a–32f the lower carriage is safely kept in place. Since the support wheels 20 preferably are flexible mounted to the mounting plate 10 it could be necessary to manually bring the magnet 32f and the support wheels 20 towards the surface of the object being measured to ensure that the magnets 32c and 32f make contact. The measuring device is then lined up to be perpendicular to the edge of the fabric. When this is done the measuring device is ready to start measuring, for example the thickness across the entire width of the fabric.

When the measuring device thus is activated the controller 24 generates a signal that starts the DC motor 30. By means of the driving shaft 40 and the driving belt 36 the power of the DC motor 30 is then transmitted to the two driving wheels 22 and the measuring device starts moving forward across the width of the fabric. The controller 24 then activates the measuring means to carry out for example a thickness measurement. The time periods between the activated modes of the measuring means can be preset. In order to obtain a high level of measuring accuracy for example 2 values/mm could be collected. The collected measuring values are then stored in the memory means 26. When the measurement is completed the values stored in the memory means 26 are transmitted to a personal computer for evaluation.

In a further embodiment both the controller 24 and the memory means 26 are located outside the measuring device and implemented in a computer.

Above some different embodiments of the present invention have been described. However, the invention is not limited to those embodiments, for example could one carriage be arranged on a beam on one side of the fabric. In this case the beam is provided across the fabric above or beneath the fabric with the beam ends fixedly supported on a both sides of the fabric. The movements across the fabric by the carriage are then guided by the beam. The driving means of the carriage could be the same as described above or be provided on the beam. The carriage could also be pulled manually across the fabric. In a further embodiment two beams are arranged on each side of the object being measured and thus both carriages are guided by a beam.

Even though this invention has been described using two carriages, one on each side of the object being measured, it is obvious to those skilled in the art that for measurements that only require measuring from one side, such as tension profile and permeability measurements, the carriage not holding the measuring means could be deleted. But to carry out measurements, such as thickness profile measurements, two carriages are required. The carriages could also for example be replaced by sledges or by crawlers. Therefore it is intended that the present invention only is limited by the scope of the appended claims.

What is claimed is:

1. Measuring device for measuring at least one of a thickness profile and a tension profile of a thin object (2) comprising
   a) upper mobile means adapted to be placed on the top side of the thin object (2)
   b) lower mobile means adapted to be placed on the bottom side of the thin object (2), directly below the upper mobile means,
   c) means (32a–32f) for holding the upper and the lower mobile means together, with the thin object (2) provided therebetween without damaging the thin object (2),
   d) measuring means (33,35) provided on at least one of the mobile means for measuring said at least one profile of the thin object (2), and
   e) driving means carried by said mobile means and wheel disposed in contact with the thin object,
   said mobile means being moveable together or separately across the surface of the thin object (2).

2. Measuring device according to claim 1, characterised in that the mobile means are carriages.

3. Measuring device according to claim 2, characterised in that the means for holding the carriages together are magnet means provided on a frame (4,6) of the upper and lower carriage respectively in paris on both sides of the thin object (2).

4. Measuring device according to claim 2, characterised in that the measuring means comprises an inductive transducer (35) for measuring the thickness profile of the thin object (2), provided on both sides of the thin object (2) on a mounting plate (8,10) of the upper and lower carriage respectively.

5. Measuring device according to claim 4, characterised in that the measuring means comprises a load cell (33), with a measuring head (34) for measuring the tension profile of the thin object (2), provided on one of the mounting plates (8, 10) of the upper and lower carriage respectively.

6. Measuring device according to claim 4, characterised in that the measuring means comprises a permeability transducer for measuring the permeability of the thin object (2), provided on one side of the thin object (2) on one of the mounting plates (8, 10) respectively.

7. Measuring device according to claim 1, characterised in that it further comprises driving means (31) for driving the measuring device across the thin object (2).

8. Measuring device according to claim 7, characterised in that there are position determining means (38) provided adjacent to a driving shaft (40) for determining the position of the measuring device.

9. Measuring device according to claim 8, characterised in that the driving means (31) comprises a DC motor (30) which by means of the driving shaft (40) and a driving belt (36) drives at least one driving wheel (22), which makes contact with the thin object (2) and drives the measuring device across the thin object (2).

10. Measuring device according to claim 1, characterised in that the measuring device is used for measuring the properties of a fabric or a felt, such as thickness and tension profile and permeability.

11. A measuring device according to claim 1, further comprising position determining means disposed in contact with the thin object.

* * * * *